United States Patent
Chapman et al.

(10) Patent No.: US 11,382,728 B2
(45) Date of Patent: Jul. 12, 2022

(54) FLOSS DISPENSER

(71) Applicant: SDC U.S. SmilePay SPV, Nashville, TN (US)

(72) Inventors: Josh Chapman, Nashville, TN (US); Brittany Lacey, Nashville, TN (US)

(73) Assignee: SDC U.S. SMILEPAY SPV, Nashville, TN (US)

( * ) Notice: Subject to any disclaimer, the term of this patent is extended or adjusted under 35 U.S.C. 154(b) by 0 days.

(21) Appl. No.: 16/951,179

(22) Filed: Nov. 18, 2020

(65) Prior Publication Data

US 2022/0151752 A1    May 19, 2022

(51) Int. Cl.
 *A61C 15/04* (2006.01)

(52) U.S. Cl.
 CPC .......... *A61C 15/043* (2013.01); *A61C 15/041* (2013.01)

(58) Field of Classification Search
 CPC ..... A61C 15/043; A61C 15/046; A61C 15/00; A61C 15/04; A61C 15/045; B65D 85/04
 USPC ................................................ 132/325, 309
 See application file for complete search history.

(56) References Cited

U.S. PATENT DOCUMENTS

| | | | | |
|---|---|---|---|---|
| 1,456,279 A | | 5/1923 | Patterson | |
| 2,893,405 A | | 7/1959 | Castelli | |
| 3,901,251 A | * | 8/1975 | Johnston | A61C 15/046 132/325 |
| 4,667,824 A | * | 5/1987 | Ditchfield | B65D 85/672 206/415 |
| 5,022,577 A | * | 6/1991 | Fike | A47F 7/17 225/39 |
| 5,054,674 A | | 10/1991 | Fortman | |
| 5,253,662 A | * | 10/1993 | Won | A61C 15/046 132/324 |
| 5,301,698 A | * | 4/1994 | Ballard | A61C 15/046 132/325 |
| 5,417,232 A | | 5/1995 | Ballard | |
| 5,806,666 A | * | 9/1998 | Chiang | A61C 15/043 132/325 |
| 8,443,817 B2 | | 5/2013 | Kalbfeld et al. | |
| 8,662,092 B2 | * | 3/2014 | Kalbfeld | A61C 15/042 132/325 |
| 2009/0095318 A1 | * | 4/2009 | Tiphonnet | A61C 15/046 132/322 |
| 2011/0203609 A1 | * | 8/2011 | Hardy | A61C 15/046 132/325 |
| 2012/0091249 A1 | * | 4/2012 | Crossett | B65D 85/04 242/580 |
| 2013/0074869 A1 | * | 3/2013 | Lee | A61C 15/043 132/325 |

(Continued)

FOREIGN PATENT DOCUMENTS

| KR | 200169429 | * | 2/2000 |
|---|---|---|---|
| KR | 200458515 | * | 2/2012 |

*Primary Examiner* — Yogesh P Patel
*Assistant Examiner* — Jennifer Gill
(74) *Attorney, Agent, or Firm* — Foley & Lardner LLP

(57) ABSTRACT

A device includes a floss assembly comprising floss wound around a spool, an insert comprising a support surface and a post configured to support the floss assembly, and a housing having a front portion and a back portion. The front portion defines a front aperture and the back portion defines a back aperture. The front aperture and the back aperture are configured to receive the insert such that the support surface interfaces with the back portion and the post interfaces with the front portion.

20 Claims, 4 Drawing Sheets

(56) References Cited

U.S. PATENT DOCUMENTS

2019/0167398 A1* 6/2019 Bixby .................. A61C 15/046

* cited by examiner

FLOSS DISPENSER

BACKGROUND

This application relates generally to the field of dental hygiene. More specifically, this application relates to a device for dispensing dental floss.

Traditional devices for dispensing dental floss are typically discarded when the floss runs out or otherwise can no longer be dispensed, causing unnecessary waste. Traditional devices for dispensing dental floss are also typically opaque, making it difficult to ascertain the amount of floss remaining. Traditional devices for dispensing dental floss do not enable a user to reload the device with new floss because taking apart such a device for replacing floss can be difficult, especially if replacing the floss requires opening the housing of the dispenser and threading an end of the replacement floss through a small aperture.

A floss dispenser that allows the user to view the remaining amount of floss is desirable. Furthermore, a floss dispenser that allows the user to replace the floss without opening the housing and threading the floss through a small aperture is desirable to address the complications and waste associated with conventional disposable floss dispensers.

SUMMARY

An embodiment relates to a device including a floss assembly, an insert, and a housing. The floss assembly comprises floss wound around a spool. The insert comprises a support surface and a post configured to support the floss assembly. The housing has a front portion and a back portion. The front portion defines a front aperture and the back portion defines a back aperture. The front aperture and the back aperture are configured to receive the insert such that the support surface interfaces with the back portion and the post interfaces with the front portion.

Another embodiment relates to a device for dispensing floss. The device includes a floss assembly, a housing, and an insert. The housing has a front portion and a back portion. The front portion defines a first aperture and the back portion defines a second aperture. The insert includes a support surface configured to interface with the second aperture when the insert is inserted into the housing, a post extending from the support surface where the post is configured to support the floss assembly and to interface with the first aperture when the insert is inserted into the housing, and an extension comprising a first flange and a second flange where the first flange and the second flange are separated by a gap.

Another embodiment relates to a device for dispensing floss. The device includes a housing, an insert, and a floss assembly. The housing has a front portion and a back portion. The front portion defines a first aperture and the back portion defines a second aperture. The front portion further includes a front surface comprising a front recessed portion defining a first aperture, an upper front surface coupled to the front surface, and a first tab coupled to and extending from the upper front surface. The insert includes a support surface configured to interface with the second aperture when the insert is inserted into the housing, and a post extending from the support surface and configured to interface with the first aperture when the insert is inserted into the housing. The floss assembly includes floss wound around a spool. The spool includes an edge positioned on an inner spool surface of the spool where the edge is configured to contact the post such that the edge is rotatably coupled to the post.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
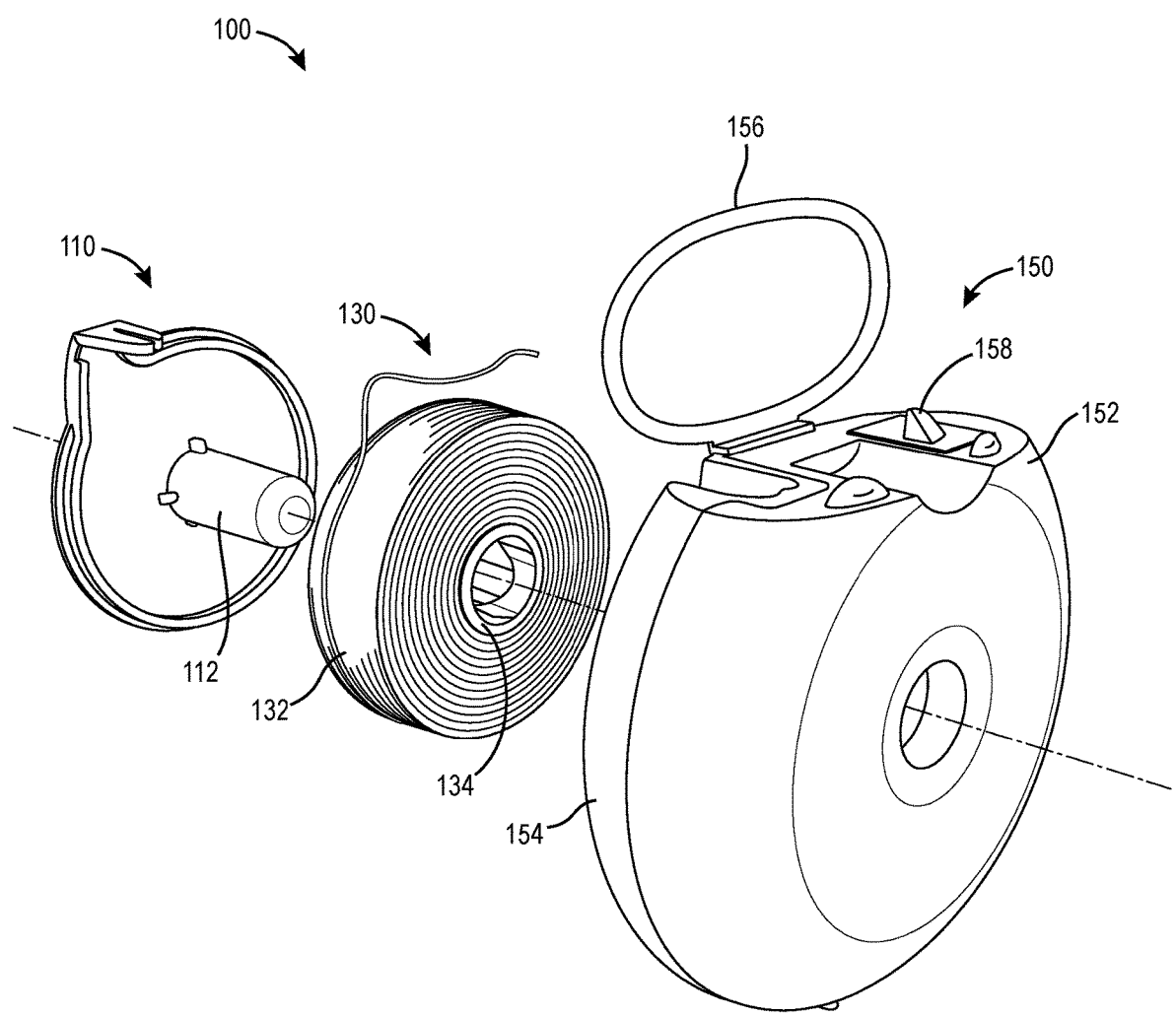
FIG. 1 is an illustration of an exploded view of a floss dispenser, according to some embodiments.

Referring to FIG. 1, an illustration of an exploded view of a floss dispenser 100 is shown, according to some embodiments. The floss dispenser 100 includes an insert 110, a floss assembly 130, and a housing 150. The housing 150 includes a front portion 152, a back portion 154, a cover 156, and a cutter 158. The front portion 152 is coupled to the back portion 154 such that the front portion 152 and the back portion 154 cannot be separated during use by a user. The cover 156 is coupled to the back portion 154 and is movable relative to the back portion 154 and the front portion 152 such that the cover 156 can be in an open position (e.g., to expose the cutter 158) and a closed position (e.g., to cover the cutter 158). The front portion 152 and the back portion 154 are further described with reference to FIGS. 3-4.

The floss assembly 130 includes a length of floss 132 that is wrapped around a spool 134. The floss assembly 130 is sized to fit within the housing 150. The floss assembly 130 is further described with reference to FIG. 6.

The insert 110 includes a post 112 that is sized to fit through the spool 134. In some embodiments, the insert 110 is transparent or translucent to allow a user to view the remaining amount of floss 132. In some embodiments, the insert 110 is opaque but includes an opening (e.g., a window, cutout, etc.) through which the user can view the remaining amount of floss 132. The insert 110 is further described with reference to FIG. 5.

To assemble the floss dispenser 100, the floss assembly 130 is coupled to the insert 110 by inserting the post 112 through the spool 134 until the post 112 contacts the spool 134. An end of the floss 132 is passed through a portion of the insert 110, and the insert 110 is coupled to the housing 150.

Figure 2:
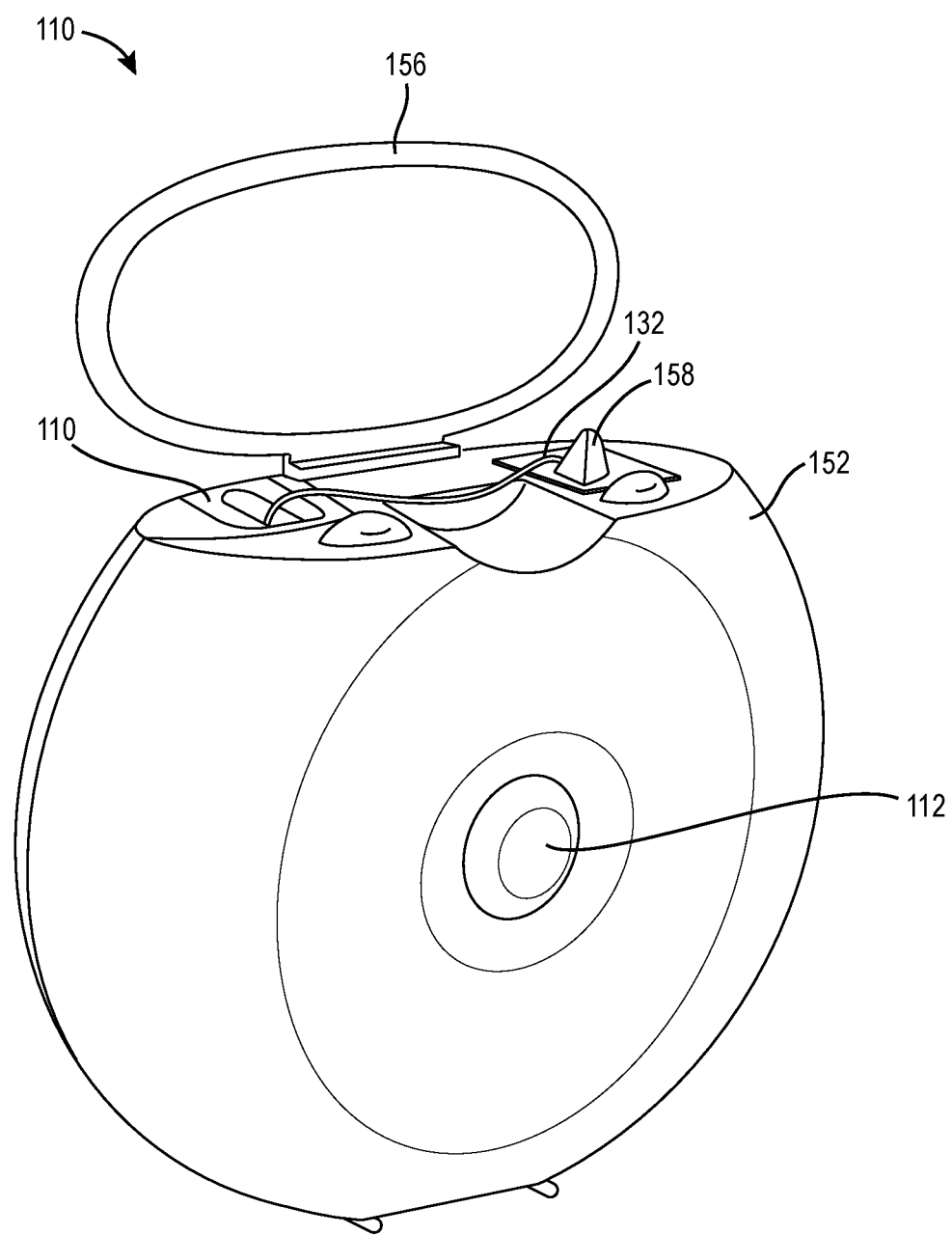
FIG. 2 is an illustration of an assembled view of the floss dispenser of FIG. 1.

FIG. 2 is an illustration of an assembled view of the floss dispenser 100 of FIG. 1. As assembled, the post 112 can be viewed and contacted from the front portion 152. The post 112 can protrude from a front surface of the front portion 152 or be flush with a front surface of the front portion. The floss 132 is shown passing through a portion of the insert 110 such that the floss 132 can be grasped by a user. To use the floss 132, the user grasps the floss 132 and pulls the floss 132, thereby causing the spool 134 to rotate within the housing 150. When the desired amount of the floss 132 is exposed, the user passes the floss 132 through the cutter 158 to remove the desired amount of the floss 132 and proceed with flossing. The remaining amount of floss can be viewed by observing the insert 110 coupled to the back portion 154. To protect the exposed length of the floss 132 between the insert 110 and the cutter 158, the cover 156 can be closed to prevent the exposed length of the floss 132 from being contaminated. For example, a user may store the floss dispenser in a bag (e.g., purse, backpack), which may not be sufficiently clean. The cover 156 may prevent the exposed length of the floss 132 from becoming dirty when stored in the bag.

When the floss 132 runs out, the user must replace the floss assembly 130 with a new floss assembly 130. To remove the empty spool 134, the user presses on the post 112 to push the insert 110 out of the back portion 154, thereby allowing the user to remove the empty spool 134 and add the new floss assembly 130. As described with reference to FIG. 1, the insert 110 and the new floss assembly 130 can be coupled to the housing 150 to assemble the floss dispenser 100 again for additional use. Replacing just the floss assembly 130 reduces waste compared to a traditional (e.g., disposable) floss dispenser because all other components of the floss dispenser 100 are reused.

When the cover 156 is closed (e.g., when the floss dispenser 100 is not in use and is being stored), the floss dispenser 100 has a cross-sectional shape that is substantially circular (e.g., within 15% of being perfectly circular). The substantially circular cross-sectional shape may provide for easier storage than a floss dispenser that includes a different cross-sectional shape (e.g., square, rectangular, etc.). For example, a floss dispenser that is a square or rectangular cross-sectional shape may be difficult to store in the pocket of a user, as the corners may irritate the user or catch when being removed. In contrast, the substantially circular cross-sectional shape of the floss dispenser 100 may be more comfortable for the user. Furthermore, the substantially circular cross-sectional shape may be sufficiently different from the shapes of other items for which a user may search, such that the floss dispenser 100 is easily identifiable without requiring the user to look at the floss dispenser 100.

Figure 3:
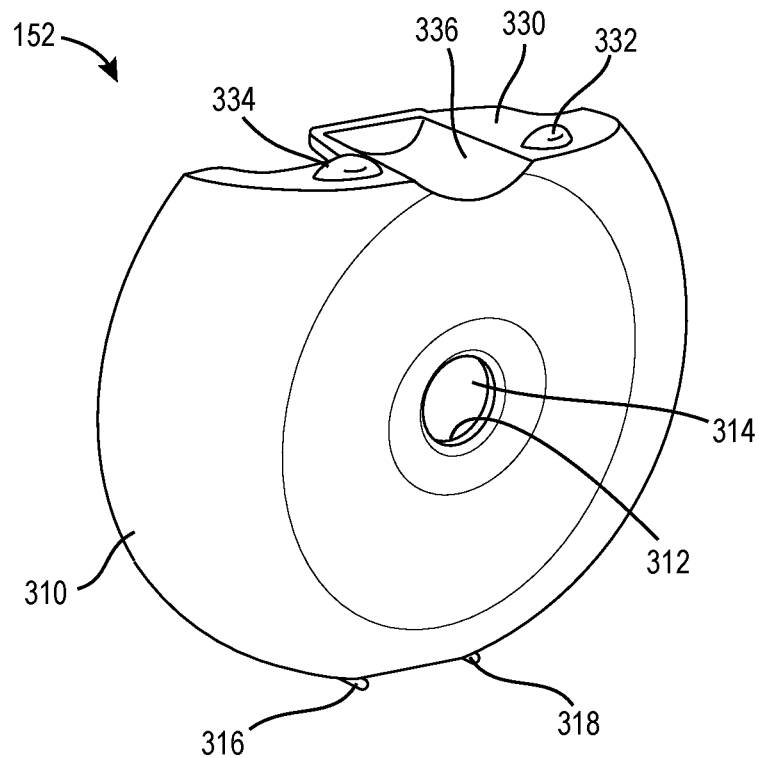
FIG. 3 is an illustration of a front portion of the floss dispenser of FIG. 1, according to some embodiments.

FIG. 3 is an illustration of the front portion 152 of the floss dispenser 100 of FIG. 1, according to some embodiments. The front portion 152 may be constructed from a plastic material (e.g., polypropylene, polyethylene, polycarbonate, etc.) and may include additional features and/or materials to prevent the front portion 152 from slipping out of the hands of the user. For example, the front portion 152 may include a surface texture (e.g., ridges, bumps, indentations, etc.), one or more additional materials (e.g., a soft touch material) that provide a surface with a higher coefficient of friction than that of the plastic material, and/or a surface treatment that changes the surface characteristics of the plastic material. The front portion 152 is shown to include a front surface 310, an upper front surface 330, a first foot 316, and a second foot 318.

The front surface 310 includes a front recessed portion 312 that defines a front aperture 314 extending through the front surface 310. As shown, the front recessed portion 312 is positioned substantially in the center (e.g., within 5 mm of the exact center) of the front surface 310. In some embodiments, the front recessed portion 312 can be positioned anywhere on the front surface 310 to provide the desired functionality. In some embodiments, the front recessed portion 312 includes one or more connectors configured to connect to a corresponding connector on the insert 110. In some embodiments, the front recessed portion includes one or more retention features to retain the insert 110 when the insert 110 is coupled to the front recessed portion 312. The retention features may include, but are not limited to, a roughened surface (e.g., mechanical or chemical roughening), a high friction material (e.g., a soft touch material, rubber, silicone, etc.), a dimensional interference (e.g., a dimension of the front recessed portion 312 may be smaller than a dimension of the post 112 such that the post 112 is retained in the front recessed portion 312 via an interference fit), and any other type of retention feature that can accomplish the desired function.

The upper front surface 330 is coupled to the front surface 310 and is positioned substantially perpendicularly (e.g., within 15% of perfectly perpendicular) to the front surface 310. In some embodiments, the upper front surface 330 and the front surface 310 are integrally formed (e.g., a unitary component formed by an injection molding process). In some embodiments, the upper front surface 330 and the front surface 310 are separate components that are coupled. Accordingly, the upper front surface 330 may be constructed from the same materials as the front surface 310. The upper front surface 330 may also be constructed from different materials than the front surface 310.

The upper front surface 330 includes a first tab 332, a second tab 334, and an indented portion 336. The first tab 332 and the second tab 334 extend from the upper front surface 330 in a direction substantially perpendicular to the upper front surface 330. The first tab 332 and the second tab 334 are configured to interface with corresponding slots on the cover 156 such that the cover is secured in a closed position. Though the features are described as tabs and slots, any type of retaining feature can be used. For example, the first tab 332 and the second tab 334 can include ridges, bumps, snaps, indentations, etc., and the corresponding features on the cover 156 may include the appropriate corresponding features to secure the cover 156 in a closed position.

The indented portion 336 is positioned between the first tab 332 and the second tab 334, is recessed below a top of the upper front surface 330 and extends from the front surface 310 partially through the upper front surface 330. In the example embodiment shown, the indented portion 336 is curved; however, in some embodiments the indented portion may be linear (e.g., resembling a square or rectangular cutout) or a combination thereof. In addition, in various embodiments the arrangement of the first tab 332, the second tab 334, and the indented portion 336 may be different from the arrangement shown in FIG. 3. For example, the indented portion 336 may be positioned such that the first tab 332 and the second tab 334 are adjacent to each other, with the indented portion being adjacent to only one of the first tab 332 or the second tab 334.

The first foot 316 and the second foot 318 extend below the front surface 310 and provide support for the floss dispenser to be placed on a substantially flat surface (e.g., a countertop, table, etc.) and remain in an upright position when the first foot 316 and the second foot 318 are in contact with the substantially flat surface. Maintaining the floss dispenser 100 in an upright position may prevent the floss dispenser 100 from getting wet when the floss dispenser 100 is positioned on a wet surface.

Figure 4:
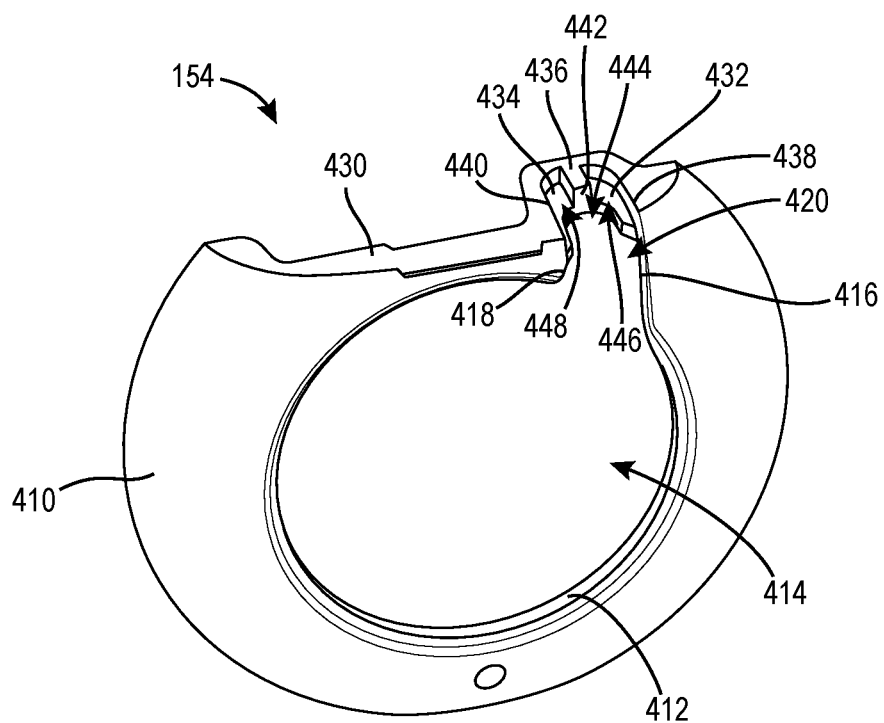
FIG. 4 is an illustration of a back portion of the floss dispenser of FIG. 1, according to some embodiments.

FIG. 4 is an illustration of the back portion 154 of the floss dispenser 100 of FIG. 1, according to some embodiments. The back portion 154 may be constructed from a plastic material (e.g., polypropylene, polyethylene, polycarbonate, etc.) and may include additional features and/or materials to prevent the back portion 154 from slipping out of the hands of the user. For example, the back portion 154 may be a surface texture (e.g., ridges, bumps, indentations, etc.), one or more additional materials (e.g., a soft touch material) that provide a surface with a higher coefficient of friction than that of the plastic material, and/or a surface treatment that changes the surface characteristics of the plastic material. The back portion 154 is shown to include a back surface 410 and an upper back surface 430.

The back surface 410 includes a back recessed portion 412 that defines a back aperture 414 extending through the back surface 410. As shown, the back recessed portion 412 is positioned substantially in the center (e.g., within 5 mm of the exact center) of the back surface 410. In some embodiments, the back recessed portion 412 includes one or more connectors configured to connect to a corresponding connector on the insert 110. In some embodiments, the front recessed portion includes one or more retention features to retain the insert 110 when the insert 110 is coupled to the back recessed portion 412. The retention features may include, but are not limited to, a roughened surface (e.g., mechanical or chemical roughening), a high friction material (e.g., a soft touch material, rubber, silicone, etc.), a dimensional interference (e.g., a dimension of the back recessed portion 412 may be smaller than a dimension of the insert 110 such that the insert 110 is retained in the back recessed portion 412 via an interference fit), and any other type of retention feature that can accomplish the desired function.

The back recessed portion 412 is coupled to a first arm 416 at a first end of the back recessed portion 412 and is coupled to a second arm 418 at a second end of the back recessed portion 412. The first arm 416 and the second arm 418 are positioned opposite each other and are substantially parallel (e.g., within 10% of perfectly parallel) to each other, thereby defining a slot 420 that extends through the back surface 410 from the back recessed portion 412 to the upper back surface 430.

The upper back surface 430 is coupled to the back surface 410 and is positioned substantially perpendicularly (e.g., within 15% of perfectly perpendicular) to the back surface 410. In some embodiments, the upper back surface 430 and the back surface 410 are integrally formed (e.g., a unitary component formed by an injection molding process). In some embodiments, the upper back surface 430 and the back surface 410 are separate components that are coupled. Accordingly, the upper back surface 430 may be constructed from the same materials as the back surface 410. The upper back surface 430 may also be constructed from different materials than the back surface 410.

The upper back surface 430 includes a first recessed wall 438 and a second recessed wall 440. The first recessed wall 438 is coupled to and extends from the first arm 416 and extends partially through the upper back surface 430, thereby exposing a first face 432. The first face 432 and the first recessed wall 438 define a first notch 446. The second recessed wall 440 is coupled to and extends from the second arm 418 and extends partially through the upper back surface 430, thereby exposing a second face 434. The second face 434 and the second recessed wall 440 define a second notch 448.

A protrusion 436 is positioned between the first notch 446 and the second notch 448 and extends from the upper back surface 430 to the first face 432 and the second face 434. A third recessed wall 442 extends through the protrusion 436, the first face 432, and the second face 434, and defines a floss guide 444. As shown, the floss guide 444 resembles a U-shape, however the floss guide can be any shape suitable to serve its function. For example, the floss guide 444 can be semi-circular, oblong, semi-elliptical, rectangular, or any other suitable shape.

Figure 5:
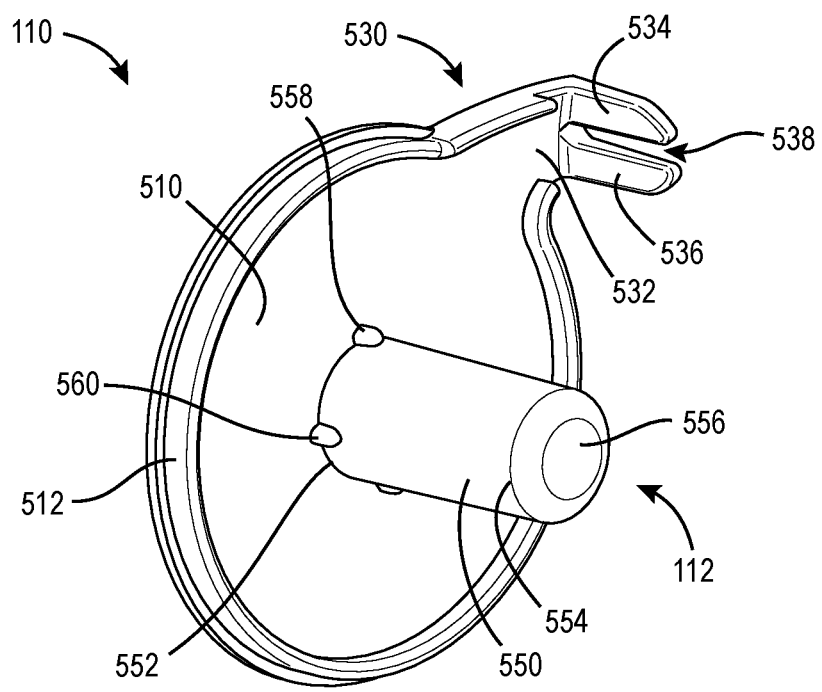
FIG. 5 is an illustration of an insert of the floss dispenser of FIG. 1, according to some embodiments.

FIG. 5 is an illustration of the insert 110 of the floss dispenser 100 of FIG. 1, according to some embodiments. The insert 110 includes a support surface 510, a ridge 512, the post 112, and a floss threading portion 530. The support surface 510 is sized and configured to interface with (e.g., contact, fit within, etc.) the back surface 410 and/or the back recessed portion 412. Accordingly, as shown, the support surface 510 is substantially circular; however, in some embodiments the support surface 510 may comprise any shape such that the support surface 510 is configured to interface with the back surface 410 and/or the back recessed portion 412. The ridge 512 is coupled to and extends from the support surface 510 and is sized and configured to interface with the back recessed portion 412 and/or the back aperture 414. In some embodiments, the ridge 512 fits within the back aperture 414 and contacts the back recessed portion 412 to facilitate insertion of the insert 110 into the back portion 154. In some embodiments, the ridge 512 is not present; however, such embodiments do not affect the function of the insert 110 as the insert 110 may be coupled to the back portion 154 without the ridge 512.

The floss threading portion 530 includes an extension 532, a first flange 534, and a second flange 536. The extension 532 is coupled to and extends from the support surface 510 and is sized and configured to fit within the slot 420. In some embodiments, the extension 532 contacts one or both of the first arm 416 and the second arm 418 when the extension 532 is positioned within the slot 420; however, in some embodiments, the extension 532 does not contact the first arm 416 and the second arm 418 when the extension 532 is positioned within the slot 420. As shown, the extension 532 and the support surface 510 are substantially coplanar (e.g., within ten percent of perfectly coplanar). However, in some embodiments the extension 532 and the support surface 510 are not substantially coplanar. The extension 532 and the support surface 510 may be integrally formed (e.g., a unitary component formed by an injection molding process). The extension 532 and the support surface 510 may also be separate components that are coupled.

The first flange 534 is coupled to and extends from the extension 532, and is sized and configured to fit within the first notch 446. The second flange 536 is coupled to and extends from the extension 532, and is sized and configured to fit within the second notch 448. The first flange 534 and the second flange 536 define a gap 538 positioned between the first flange 534 and the second flange 536. The gap 538 is sized to receive the protrusion 436 and the floss 132.

The post 112 includes a tubular portion 550. The tubular portion 550 is coupled to and extends from the support surface 510. In some embodiments, the tubular portion 550 and the support surface 510 may be integrally formed (e.g., a unitary component formed by an injection molding process). In some embodiments, the tubular portion 550 and the support surface 510 are separate components that are coupled. The tubular portion 550 comprises a shape that resembles a tapered cylinder that is substantially circular in cross-section comprising a base portion 552 and a top portion 554. The base portion 552 has a base diameter that is larger than a top diameter of the top portion 554. In some embodiments, the difference between the values of the base diameter and the top diameter corresponds to a taper of a wall of the tubular portion 550 of approximately two to ten degrees (e.g., an angle corresponding to a draft angle for a manufacturing process such as injection molding). In some embodiments, the top portion 554 is sized and configured to fit within the front aperture 314 and interface with the front recessed portion 312 to secure the insert 110 to the housing 150. To facilitate securing the insert 110 to the front recessed portion 312, the top diameter of the top portion 554 may be slightly larger (e.g., one to ten percent larger) than a diameter of the front recessed portion 312 to cause an interference fit between the tubular portion 550 and the front recessed portion 312. In another embodiment, the tubular portion 550 may include a retention feature (e.g., a flange, tab, slot, protrusion, ridge, recess, etc.) that is sized to interface with a corresponding retention feature on the front recessed portion 312 to secure the insert 110 to the housing 150.

In some embodiments, the top portion 554 includes a cap 556. The cap 556 is a solid component that may be formed integrally with the top portion 554 such that the cap 556 and the top portion 554 are a unitary component. In some embodiments, the cap 556 is a separate component that is coupled to the top portion 554. The cap 556 extends from the top portion 554 and is configured to provide a surface for a user to press to facilitate removal of the insert 110 from the housing 150.

In some embodiments, the post 112 further includes a first base support 558 and a second base support 560 (collectively referred to herein as "base supports 558, 560"). One of ordinary skill would appreciate that more or fewer base supports may be used. The base supports 558, 560 are coupled to both the support surface 510 and the tubular portion 550. In some embodiments, the base supports 558, 560 are configured to prevent the tubular portion 550 from bending if subjected to a bending force. In some embodiments, the base supports 558, 560 provide surfaces on which the spool 134 can rotate when the floss 132 is pulled by a user.

Figure 6:
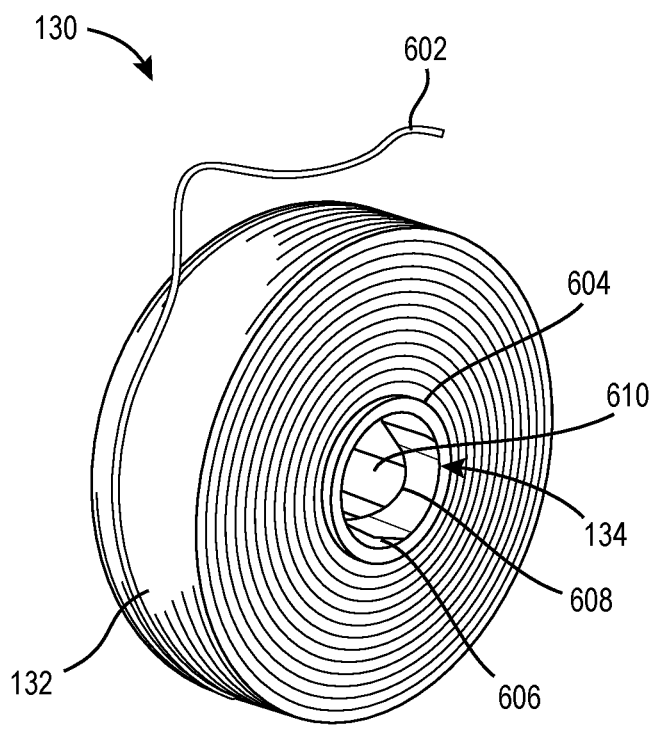
FIG. 6 is an illustration of a floss assembly of the floss dispenser of FIG. 1, according to some embodiments.

FIG. 6 is an illustration of the floss assembly 130 of the floss dispenser 100 of FIG. 1, according to some embodiments. The floss assembly 130 includes a free end 602 of the floss 132, the free end available to be grasped and pulled by a user. The floss 132 may be any type of floss used to remove debris from between teeth. For example, the floss 132 may be constructed from nylon, polytetrafluoroethylene (PTFE), or any other material suitable for use as dental floss. In some embodiments, the floss 132 may include a single strand of floss wrapped around the spool 134. The floss 132 may also include two or more strands of floss wrapped around the spool 134. For example, the floss 132 may include two strands of floss that are twisted together, where each strand of floss may have different properties. One of the strands of floss may be constructed from nylon, and the other strand of floss may be constructed from a material that expands upon contact with a liquid (e.g., saliva) or exposure to a humid environment. Floss that includes an expandable material may provide for efficient flossing by expanding to fill gaps in between teeth to remove debris more effectively than floss that does not include an expandable material. The floss 132 may also be coated with additional materials (e.g., sodium bicarbonate, etc.) to whiten teeth while flossing.

As described, the floss 132 is wrapped around the spool 134. The amount of the floss 132 wrapped around the spool 134 may be based on how long the floss 132 is expected to last under typical use conditions (e.g., a certain length of the floss 132 used per day by a typical user). For example, the amount of the floss 132 included in the floss dispenser 100 may be enough to last for one month, three months, six months, nine months, one year, or any other suitable duration based on the frequency of use and amount used. For example, the amount of the floss 132 can be 30 yards, 55 yards, 70 yards, 100 yards, or in the range of 20 to 100 yards, 30 to 70 yards, or 40 to 60 yards, etc.

The spool 134 includes an outer spool surface 604, an inner spool surface 606, and an edge 608. The spool 134 may be constructed from any suitable material including, but not limited to, polypropylene, polyethylene, polycarbonate, or any other material capable of performing as desired. In some embodiments, the spool 134 is constructed from the same material as the insert 110. The spool 134 may also be constructed from a different material than the insert 110. The outer spool surface 604 is the surface around which the floss 132 is wrapped or wound. The inner spool surface 606 defines an opening 610 that is sized and configured to fit around the post 112 such that the post 112 can be inserted through the opening 610. In some embodiments, the inner spool surface 606 contacts the tubular portion 550 when the floss dispenser 100 is fully assembled. In some embodiments, the inner spool surface 606 includes an edge 608 that extends around and protrudes from the inner spool surface into the opening 610. In such embodiments, the edge 608 contacts the tubular portion 550 when the floss dispenser is fully assembled. Accordingly, when the spool 134 rotates around the tubular portion 550, the inner spool surface 606 is spaced apart from the tubular portion 550 while the edge 608 is in rotatable contact with the tubular portion 550. Though one edge 608 is shown, one of ordinary skill in the art would understand that more than one edge 608 may be disposed along a length of the inner spool surface 606 to facilitate rotation of the spool 134 around the tubular portion 550.

In operation, and with reference to FIGS. 1-6, a user may be using the floss dispenser 100 to floss and find that the floss dispenser 100 needs more floss, and thus a new floss assembly 130 is needed. To remove the remains of the previous floss assembly 130, the user removes the insert 110 from the housing 150. To remove the insert 110 from the housing, in some embodiments the user pushes on the cap 556 to dislodge the tubular portion 550 from the front recessed portion 312. In some embodiments, when the user pushes on the cap 556 the ridge 512 is dislodged from the back recessed portion 412. In some embodiments, when the user pushes on the cap 556 both the tubular portion 550 is dislodged from the front recessed portion 312 and the ridge 512 is dislodged from the back recessed portion 412.

After removing the insert 110 from the housing 150, the user can discard the used spool and any remaining floss. The user then inserts the post 112 into the spool 134 until the inner spool surface 606 or the edge 608 contacts the tubular portion 550. In some embodiments, the spool contacts the base supports 558, 560 when the post 112 is inserted into the spool 134. The user then grasps the free end 602 of the floss 132 and places the free end 602 into the gap 538. Because the gap 538 is positioned to receive the free end 602 between the first flange and the second flange, the free end 602 does not need to be threaded through a small opening (e.g., a hole slightly larger than the free end 602) to prepare the floss dispenser 100 for use. The user then assembles the insert 110 to the housing 150 until the insert 110 is secure in the housing 150. The insert 110 can be secured by one or both of coupling the tubular portion 550 to the front recessed portion 312 (e.g., via a press fit, corresponding retention features, etc.), and coupling the ridge 512 to the back recessed portion 412 (e.g., via a press fit, corresponding retention features, etc.). When the insert 110 is secured to the housing 150, the first flange 534 is received by the first notch 446, the second flange 536 is received by the second notch 448, and the protrusion 436 is received by the gap 538, thereby decreasing the size of the gap 538 through which the free end 602 is passed. The floss 132 is thereby guided by the floss guide 444 and the gap 538.

With the floss dispenser 100 assembled as described, the user can pull the free end 602 to provide a desired length of the floss 132 to use for flossing the user's teeth. When the desired length of the floss 132 is exposed, the user can remove the desired length of the floss 132 by pulling the desired length of the floss 132 against the cutter 158 to sever the desired length of the floss 132. Severing the desired length of the floss 132 creates a new free end 602 that the user can pull the next time the user desired to floss the user's teeth. The user can then close the cover 156 by coupling the cover 156 to the first tab 332 and the second tab 334. To open the cover for the next use, the user can open the cover 156 by using a finger to contact the cover 156 in the area corresponding to the indented portion 336 and applying a force to the cover 156 to decouple the cover 156 from the first tab 332 and the second tab 334. The user can also view a remaining amount of the floss 132 by looking at the insert 110 when the floss dispenser 100 is assembled as the insert is translucent or transparent.

It is important to note that the construction and arrangement of the systems, apparatuses, and methods shown in the various exemplary embodiments is illustrative only. Additionally, any element disclosed in one embodiment may be incorporated or utilized with any other embodiment disclosed herein. For example, any of the exemplary embodiments described in this application can be incorporated with any of the other exemplary embodiment described in the application. In some cases, although only one example of an element may be described as being incorporated or utilized in an embodiment, it should be appreciated that other elements described with respect to any of the various embodiments may be incorporated or utilized with any of the other embodiments disclosed herein.

Although the figures and description may illustrate a specific order of method steps, the order of such steps may differ from what is depicted and described, unless specified differently above. Also, two or more steps may be performed concurrently or with partial concurrence, unless specified differently above. All such variations are within the scope of the disclosure.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

As utilized herein, the terms "approximately," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical or fluidic.

What is claimed is:

1. A device comprising:
   a floss assembly comprising floss wound around a spool;
   an insert comprising a disc shaped support surface and a post configured to support the floss assembly; and
   a housing having a front piece and a back piece, the front piece having a front aperture that extends through the front piece, the back piece having a back aperture that extends through the back piece, the front aperture and the back aperture configured to receive the insert, wherein the insert is configured to be selectively inserted within or removed from the front aperture and the back aperture, and wherein when the insert is inserted within the front aperture and the back aperture the support surface of the insert interfaces with the back piece, the back piece substantially surrounds the support surface, and the post extends through the front aperture such that an end of the post is flush with or extends past a front surface of the front piece;
   wherein the housing has a truncated toroidal shaped exterior; and wherein the insert is smaller than the housing.

2. The device of claim 1, wherein the insert further comprises:
   a ridge protruding from and extending substantially around the support surface, the ridge configured to fit within the back aperture when the insert is received within the housing.

3. The device of claim 2, wherein the post is a unitary component comprising:
   a tubular portion coupled to and extending from the support surface, the tubular portion including a first end positioned adjacent to the support surface and a second end positioned opposite the first end, the tubular portion sized to fit within the first aperture; and a top portion forming the second end of the tubular portion.

4. The device of claim 1, wherein the post extends through the spool.

5. The device of claim 3, further comprising a first base support extending from the support surface and the tubular portion, the first base support configured to interface with the spool.

6. The device of claim 3, wherein the tubular portion is configured to secure the insert to the front piece.

7. The device of claim 1, wherein the insert further comprises a gap configured to receive and guide a free end of the floss.

8. A device for dispensing floss, comprising:
a floss assembly;
a housing having a front piece and a back piece, the front piece having a first aperture that extends through the front piece, the back piece having a second aperture that extends through the back piece; and
an insert configured to be selectively inserted into or removed from the housing via the first aperture and the second aperture, the insert comprising:
a support surface configured to interface with the second aperture and be substantially surrounded by the back piece when the insert is inserted into the housing;
a post extending from the support surface, the post configured to support the floss assembly, wherein the post is configured to extend through the first aperture when the insert is inserted into the housing such that an end of the post is flush with or extends past a front surface of the front piece; and
an extension extending from the support surface in a direction substantially coplanar with the support surface and comprising a first flange and a second flange, the first flange and the second flange being separated by a gap; and wherein the insert is smaller than the housing.

9. The device of claim 8, wherein the floss assembly comprises a spool around which a length of floss is wound, the length of floss comprising a free end.

10. The device of claim 9, wherein the spool includes an outer spool surface around which the length of floss is wound and an inner spool surface defining an opening configured to receive the post.

11. The device of claim 10, wherein the inner spool surface comprises an edge protruding from the inner spool surface and into the opening.

12. The device of claim 11, wherein the edge is configured to contact the post such that the edge is rotatably coupled to the post.

13. The device of claim 12, wherein the free end is configured to fit within the gap and is further configured to be guided through the gap by the first flange and the second flange.

14. The device of claim 13, wherein the spool is configured to rotate around the post when the free end is pulled through the gap.

15. A device for dispensing floss, comprising:
a housing having a front piece and a back piece connected to the front piece, wherein the front piece comprises:
a front surface comprising an upper front surface and a front recessed portion defining a first aperture, the first aperture extending through the front surface; and
a first tab extending from the upper front surface;
an insert configured to be selectively inserted within or removed from a back recessed portion of the back piece, wherein the back recessed portion defines a second aperture, the insert comprising:
a support surface configured to interface with the second aperture and be substantially surrounded by the back piece when the insert is inserted into the housing, the second aperture extending through the back piece;
a post extending from the support surface, wherein the post is configured to extend through the first aperture when the insert is inserted into the housing such that an end of the post is flush with or extends past the front surface of the front piece; and
a floss threading portion configured to receive a free end of floss, the floss threading portion comprising a first extension extending from the support surface in a direction substantially coplanar with the support surface;
wherein the support surface is substantially disc shaped and surrounded by a ridge, and wherein the first extension comprises a second extension extending from and perpendicular to the support surface; and
a floss assembly comprising floss wound around a spool, the spool comprising an edge positioned on an inner spool surface of the spool, the edge configured to contact the post such that the edge is rotatably coupled to the post; and wherein the insert is smaller than the housing.

16. The device of claim 15, further comprising a cover movably coupled to the back piece and configured to cover the upper front surface, the cover configured to interface with the first tab to secure the cover to the upper front surface.

17. The device of claim 16, wherein when the cover is secured to the upper front surface, an indented portion is exposed.

18. The device of claim 17, further comprising a second tab coupled to and extending from the upper front surface, wherein the indented portion is positioned between the first tab and the second tab.

19. The device of claim 18, wherein the cover is configured to interface with the second tab to secure the cover to the upper front surface.

20. The device of claim 16, wherein the upper front surface further comprises a cutter configured to cut the floss.

* * * * *